United States Patent
Kajuluri et al.

(10) Patent No.: US 11,455,852 B2
(45) Date of Patent: Sep. 27, 2022

(54) VEHICLE DEAUTHORTIZATION OF USER DEVICE

(71) Applicant: Ford Global Technologies, LLC, Dearborn, MI (US)

(72) Inventors: Venkata Kishore Kajuluri, Southgate, MI (US); Lisa Therese Boran, Northville, MI (US); Xin Ye, Farmington Hills, MI (US); Jacob David Nelson, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/171,018

(22) Filed: Feb. 9, 2021

(65) Prior Publication Data

US 2022/0254205 A1    Aug. 11, 2022

(51) Int. Cl.
*G07C 9/00* (2020.01)
*H04W 64/00* (2009.01)

(52) U.S. Cl.
CPC ...... *G07C 9/00309* (2013.01); *H04W 64/003* (2013.01); *G07C 2009/00325* (2013.01); *G07C 2009/00373* (2013.01); *G07C 2009/00476* (2013.01)

(58) Field of Classification Search
CPC ...... G07C 9/00309; G07C 2009/00325; G07C 2009/00373; G07C 2009/00476; H04W 64/003
USPC .................................................. 340/5.1, 5.72
See application file for complete search history.

(56) References Cited

U.S. PATENT DOCUMENTS

| | | | | |
|---|---|---|---|---|
| 6,956,480 B2* | 10/2005 | Jespersen | ........... | G08B 13/1427 340/568.1 |
| 7,890,743 B2* | 2/2011 | Buchanan | ............ | H04L 63/107 455/26.1 |
| 9,443,365 B2* | 9/2016 | Ahearn | .................... | G07C 9/28 |
| 9,691,193 B2 | 6/2017 | Pandya et al. | | |
| 10,043,330 B2* | 8/2018 | Earles | ................ | G07C 9/00309 |
| 10,358,116 B1 | 7/2019 | Jayaraman et al. | | |
| 10,814,835 B2* | 10/2020 | Chengalvala | .......... | B60R 25/23 |
| 10,939,296 B2* | 3/2021 | Whitaker | ............ | H04L 63/0807 |
| 11,124,154 B1* | 9/2021 | Bojinov | ................. | G08G 1/202 |
| 2017/0092028 A1* | 3/2017 | Weicker | ............ | G07C 9/00309 |
| 2020/0059787 A1 | 2/2020 | Whitaker et al. | | |
| 2021/0001806 A1* | 1/2021 | Kim | ........................ | B60R 25/24 |

FOREIGN PATENT DOCUMENTS

JP          5803724 B2     9/2015

* cited by examiner

*Primary Examiner* — Nam V Nguyen
(74) *Attorney, Agent, or Firm* — Brandon Hicks; Bejin Bieneman PLC

(57) ABSTRACT

Authorization of a user device is suspended based on determining, for a first predetermined time, a distance between the user device and a vehicle is greater than a threshold distance. Then a user input specifying a vehicle parameter is requested. Upon receiving the user input, the user input is validated based on the user input matching a stored vehicle parameter. The user device is deauthorized based on a) failing to receive a valid user input within a second predetermined time, or b) receiving a number of invalid user inputs equal to a threshold number.

20 Claims, 2 Drawing Sheets

VEHICLE DEAUTHORTIZATION OF USER DEVICE

BACKGROUND

Various mechanisms can be provided to allow a user to access and operate a vehicle. For example, a user could be provided with a physical key, an electronic fob, etc., to allow the user to access and operate the vehicle. As another example, a user might also be provided with means for electronic authentication, e.g., a user device authorized to communicate with the vehicle to provide commands to the vehicle, a passcode that could be input via an interface provided on the vehicle, etc.

DETAILED DESCRIPTION

Figure 1:
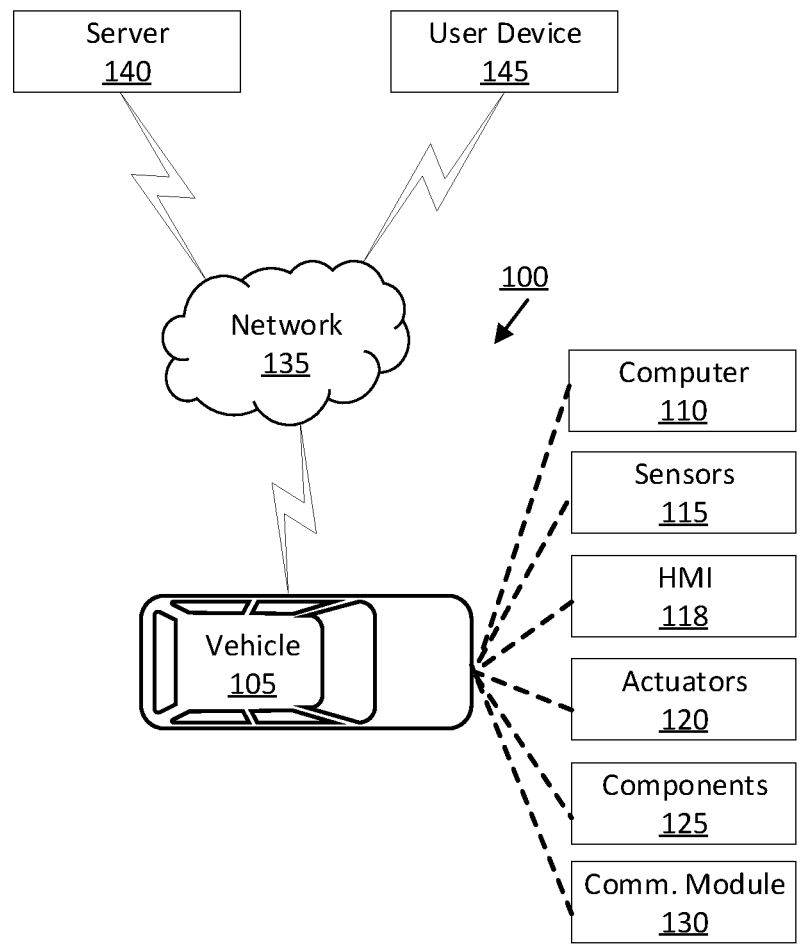
FIG. 1 is a block diagram illustrating an example vehicle control system for a vehicle.

A system includes a computer including a processor and a memory, the memory storing instructions executable by the processor to suspend authorization of a user device based on determining, for a first predetermined time, a distance between the user device and a vehicle is greater than a threshold distance. The instructions further include instructions to then request a user input specifying a vehicle parameter. The instructions further include instructions to, upon receiving the user input, validate the user input based on the user input matching a stored vehicle parameter. The instructions further include instructions to deauthorize the user device based on a) failing to receive a valid user input within a second predetermined time, or b) receiving a number of invalid user inputs equal to a threshold number.

The instructions can further include instructions to reauthorize the user device based on receiving the valid user input within the second predetermined time.

The instructions can further include instructions to, upon reauthorizing the user device, actuate a vehicle component based on receiving a message from the user device.

The instructions can further include instructions to, upon suspending authorization of the user device, prevent actuation of a vehicle component based on receiving a message from the user device.

The instructions can further include instructions to suspend authorization of the user device based further on the user device not being in communication with the vehicle for the first predetermined time.

The instructions can further include instructions to maintain the authorization of the user device based on determining, within the first predetermined time, that the user device is in communication with the vehicle.

The instructions can further include instructions to maintain the authorization of the user device based on determining, within the first predetermined time, that the distance is less than or equal to the threshold.

The instructions can further include instructions to determine the distance based on comparing location data of the vehicle to location data of the user device.

The instructions can further include instructions to, upon deauthorizing the user device, stop communicating with the user device.

The instructions can further include instructions to maintain the authorization of the user device based on determining, within the first predetermined time, the distance is less than or equal to the threshold.

The instructions can further include instructions to actuate a vehicle component based on receiving a message from an authorized user device.

The second predetermined time can be longer than the first predetermined time.

A method includes suspending authorization of a user device based on determining, for a first predetermined time, a distance between the user device and a vehicle is greater than a threshold distance. The method further includes then requesting a user input specifying a vehicle parameter. The method further includes, upon receiving the user input, validating the user input based on the user input matching a stored vehicle parameter. The method further includes deauthorizing the user device based on a) failing to receive a valid user input within a second predetermined time, or b) receiving a number of invalid user inputs equal to a threshold number.

The method can further include reauthorizing the user device based on receiving the valid user input within the second predetermined time.

The method can further include, upon suspending authorization of the user device, preventing actuation of a vehicle component based on receiving a message from the user device.

The method can further include suspending authorization of the user device based further on the user device not being in communication with the vehicle for the first predetermined time.

The method can further include determining the distance based on comparing location data of the vehicle to location data of the user device.

The method can further include, upon deauthorizing the user device, stopping communication with the user device.

The method can further include maintaining the authorization of the user device based on determining, within the first predetermined time, the distance is less than or equal to the threshold.

The method can further include actuating a vehicle component based on receiving a message from an authorized user device.

Further disclosed herein is a computing device programmed to execute any of the above method steps. Yet further disclosed herein is a computer program product, including a computer readable medium storing instructions executable by a computer processor, to execute an of the above method steps.

A user may authorize a user device to communicate with a vehicle computer. By authorizing the user device to communicate with the vehicle computer, the user may be able to control the vehicle when the user is remote from the vehicle. Additionally, the user device may be able to access the vehicle computer, which can allow the user device to perform one or more functions, e.g., making a phone call, playing audio file stored on the user device, etc., via one or more vehicle components. Typically, the vehicle computer stores an identifier for the authorized user device in a memory until a user provides a user input selecting to remove, i.e., deauthorize, the authorized user device. However, possession and/or ownership of the vehicle and/or the authorized user device may be transferred to different users. In such examples, the authorized user device may be able to control a vehicle despite the user associated with the authorized user device lacking authority to control the vehicle.

Advantageously, the vehicle computer can suspend authorization of a user device based on, for a first predetermined time, a distance between the user device and the vehicle being greater than a threshold or the user device not being in communication with the vehicle. The vehicle computer can then deauthorize the user device without input from a user based on the user device not being reauthorized within a second predetermined time after being suspended. Deauthorizing the user device prevents the user device from accessing the vehicle, which can reduce the likelihood of an unauthorized user controlling the vehicle with the user device.

Figure 2:
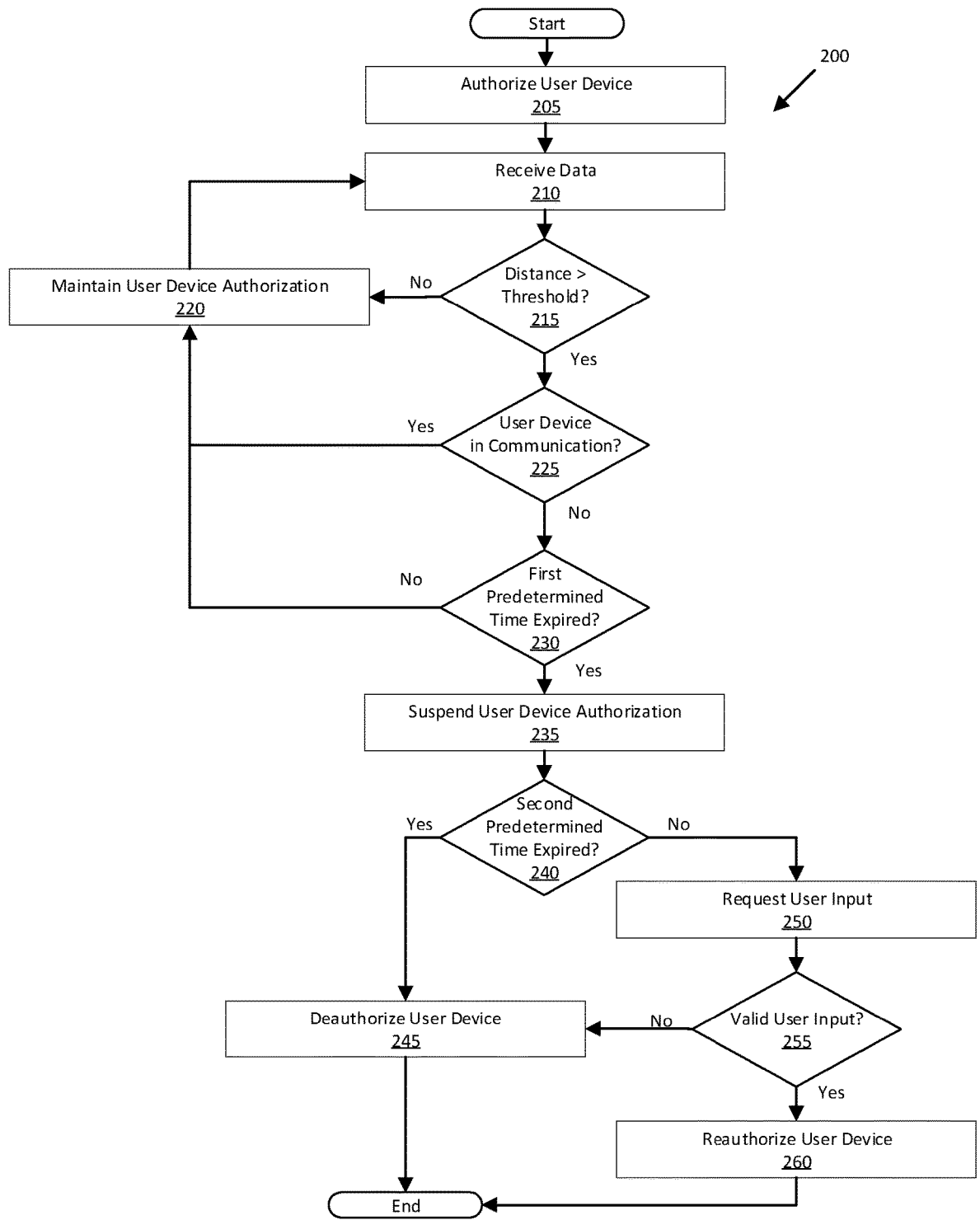
FIG. 2 is a flowchart of an example process for deauthorizing a user device.

With reference to FIGS. 1-2, an example vehicle control system 100 includes a vehicle 105. A vehicle computer 110 in the vehicle 105 receives data from sensors 115. The vehicle computer 110 is programmed to suspend authorization of a user device 145 based on determining, for a first predetermined time, that a distance between the user device 145 and the vehicle 105 is greater than a threshold distance. The vehicle computer 110 is further programmed to then request a user input specifying a vehicle parameter. The vehicle computer 110 is further programmed to, upon receiving the user input, then validate the user input based on the user input matching a stored vehicle parameter. The vehicle computer 110 is further programmed to deauthorize the user device 145 based on a) failing to receive a valid user input within a second predetermined time, or b) receiving a number of invalid user inputs equal to a threshold number.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, a user device 145, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The vehicle 105 further includes a human-machine interface (HMI) 118. The HMI 118 includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the HMI 118. The user may provide each user input via the HMI 118, e.g., by pressing a virtual button on a touchscreen display, by providing voice commands, etc. For example, a touchscreen display included in an HMI 118 may include sensors 115 to detect that a user pressed a virtual button on the touchscreen display to, e.g., select or deselect a vehicle operation mode, such as an eco-mode, a sport mode, a draft mode, etc., which input can be received in the first computer 110 and used to determine the selection of the user input.

The HMI 118 typically further includes output devices such as displays (including touchscreen displays), speakers, and/or lights, etc., that output signals or data to the user. The HMI 118 is coupled to the vehicle communications network and can send and/or receive messages to/from the vehicle computer 110 and other vehicle sub-systems.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, etc.

The user device 145 includes a user interface. The user interface includes user input devices such as knobs, buttons, switches, pedals, levers, touchscreens, and/or microphones, etc. The input devices may include sensors 115 to detect user inputs and provide user input data to the vehicle computer 110. That is, the vehicle computer 110 may be programmed to receive user input from the user interface. The user may provide each user input via the user interface, e.g., by pressing a virtual button on a touchscreen display, by providing voice commands, etc. For example, a touchscreen display included in the user interface may include sensors 115 to detect that a user pressed a virtual button on the touchscreen display to, e.g., request operation of the vehicle 105, schedule a pick-up time, etc., which input can be received in the vehicle computer 110 and used to determine the selection of the user input.

The user interface of a user device 145 typically further includes output devices such as displays (including touchscreen displays), speakers, and/or lights, etc., that output signals or data to the user. Upon receiving data input from the user, the user device 145 can transmit the specified data to the vehicle computer 110, e.g., via the network 135.

To prevent an intruder computer and/or unauthorized user from controlling the vehicle 105, the vehicle computer 110 may be programmed to authorize a user device 145 to control the vehicle 105. The vehicle computer 110 may be programmed to authorize the user device 145 based on a key, e.g., a combination of numbers and/or characters, received from the user device 145. For example, the vehicle computer 110 may authorize the user device 145 based on determining the received key matches an expected key, e.g., known to certain parties such as vehicle distributors, e.g., dealers, stored in the memory of the vehicle computer 110.

As another example, the vehicle computer 110 may receive a request to access the vehicle 105 from the user device 145. The request may include a vehicle identifier, e.g., an alphanumeric string of characters that identifies the vehicle such as a vehicle identification number (VIN), a license plate number, etc. Upon determining the received vehicle identifier matches a stored vehicle identifier, e.g., stored in a memory of the vehicle computer 110, the vehicle computer 110 may actuate the HMI 118 to detect a first user input verifying the user device 145. For example, the HMI 118 may be programmed to display a virtual button on a touchscreen display that the user can press to verify the user device 145. In other words, the HMI 118 may activate sensors 115 that can detect the user pressing the virtual button to verify the user device 145. Upon detecting the first user input, the HMI 118 can then provide the first user input to the vehicle computer 110, and the vehicle computer 110 can authorize the user device 145 based on the first user input. The vehicle computer 110 may authorize the user device 145 upon receiving the first user input within a predetermined time period, e.g., 10 seconds, 30 seconds, etc., after actuating the HMI 118.

Alternatively, the remote server computer 140 may be programmed to authorize the user device 145 to control the vehicle 105. In such an example, the remote server computer 140 can receive the request to access the vehicle 105 from the user device 145. The remote server computer 140 can initiate communication with the vehicle computer 110 based on the vehicle identifier included in the request. The vehicle computer 110 can then actuate the HMI 118 to detect the first user input verifying the user device 145, as discussed above. Upon detecting the first user input, the HMI 118 can then provide the first user input to the vehicle computer 110, and the vehicle computer 110 can provide the first user input to the remote server computer 140. The remote server computer 140 can then authorize the user device 145 based on the first user input, which allows the user device 145 to communicate with the vehicle computer 110.

Upon authorizing the user device 145, the vehicle computer 110 and the user device 145 may transfer data with each other, e.g., via the network 135. The transferred data may be stored, e.g., in respective memories. Additionally, or alternatively, the vehicle computer 110 may allow the user device 145 to access the vehicle computer 110, e.g., to allow the user device 145 to perform one or more functions via one or more vehicle components 125.

While the user device 145 is authorized, the vehicle computer 110 may initiate communication with the user device 145 based on receiving a request from the user device 145 when the distance is less than or equal to the threshold distance. The user device 145 may transmit the request, e.g., via the network 135, based on receiving a second user input, as discussed below. Alternatively, the vehicle computer 110 may initiate communication with the user device 145 based on a distance between the user device 145 and the vehicle 105. For example, the user device 145 can transmit, e.g., via the network 135, location data, e.g., geo-coordinates, of the user device 145 to the vehicle computer 110. The vehicle computer 110 can then determine the distance between the vehicle 105 and the user device 145 by comparing the location of the user device 145 to the location of the vehicle 105. For example, the vehicle computer 110 can determine the distance between the vehicle 105 and the user device 145 based on determining a length of a line between the geo-coordinates specifying the vehicle 105 location and the geo-coordinates specifying the user device 145 location, e.g., by using the distance formula. That is, the vehicle computer 110 can determine the distance based on determining a difference between geo-coordinates specifying the vehicle 105 location and corresponding geo-coordinates specifying the user device 145 location.

The vehicle computer 110 can then compare the distance to a threshold distance. The threshold distance specifies a maximum distance between the user device 145 and the vehicle 105 within which the user device 145 can communicate with the vehicle 105. The threshold distance may be determined empirically, e.g., based on determining a maximum range of communication of the communication mechanism(s) in the vehicle 105. If the distance is greater than the threshold distance, the vehicle computer 110 stops communicating with the user device 145. If the distance is less than or equal to the threshold distance, then the vehicle computer 110 may initiate communication with the user device 145.

While in communication with the authorized user device 145, the vehicle computer 110 can operate the vehicle 105 based on receiving a message from the authorized user device 145. For example, the vehicle computer 110 can actuate one or more vehicle components 125, e.g., a door lock, a climate control component, an ignition component, etc., based on commands included in the message received from the user device 145. The user device 145 may transmit the message, e.g., via the network 135, based on receiving a third user input, as discussed below.

Prior to actuating the vehicle component 125, the vehicle computer 110 may authenticate the message from the user device 145. Authentication of a digital communication or message as discussed herein means implementing a scheme for determining an authenticity (or lack thereof) of the communication or message, e.g., a message from the user device 145 to the vehicle computer 110 requesting actuation of a vehicle component 125. Various known techniques such as an authentication signature (or digital signature) may be used for authentication. The vehicle computer 110 can conclude that the message was created by the user device 145 upon detecting a valid authentication signature included in a received message.

For example, the user device 145 may be programmed to perform the authentication by sending a message including an authentication signature to the vehicle computer 110. The authentication signature may be based on data, known to both parties, e.g., an identifier of a sender, a local time, etc., and/or an encryption/decryption key. Thus, a receiver can verify the authentication signature based on the encryption key, the decryption key, and/or the known data such as the user device 145 identifier.

The vehicle computer 110 may be programmed to receive a message sent from the user device 145 and authenticate the user device 145 based on the authentication signature. In one example, the vehicle computer 110 may be programmed to authenticate the user device 145 based on data stored in the vehicle computer 110 or otherwise accessible by the vehicle computer 110. For example, the vehicle computer 110 may authenticate the user device 145 by determining whether the authentication signature is included in a list of valid authentication signatures stored in the vehicle computer 110 or a memory accessible by the vehicle computer 110. In such an example, upon authorizing the user device 145, the vehicle computer 110 may receive the authentication signature from the user device 145 and store the authentication signature in the list of valid authentication signatures.

The vehicle computer 110 can monitor the distance between the authorized user device 145 and the vehicle 105. Upon determining the distance is greater than the threshold distance, the vehicle computer 110 can initiate a first timer. The vehicle computer 110 then monitors for expiration of the first timer and for the distance between the user device 145 and the vehicle 105. A duration of the first timer is the first predetermined time, e.g., 10 days, 30 days, etc. The first predetermined time is specified by a vehicle 105 and/or component 125 manufacturer and may be stored, e.g., in the memory of the vehicle computer 110. If the vehicle computer 110 determines the distance is less than or equal to the threshold distance prior to expiration of the first timer, i.e., within the first predetermined time, then the vehicle computer 110 resets the first timer and maintains the authorization of the user device 145. That is, the vehicle computer 110 can continue to operate the vehicle 105 based on receiving a message from the user device 145. If the vehicle computer 110 determines that the distance remains greater than the threshold distance for the duration of the first timer, i.e., the first predetermined time, then the vehicle computer 110 suspends the authorization of the user device 145.

Additionally, or alternatively, the vehicle computer 110 monitors the communication between the authorized user device 145 and the vehicle 105. For example, the vehicle computer 110 may send a message to the user device 145, e.g., via the network 135. The vehicle computer 110 may determine that the user device 145 is in communication with the vehicle computer 110 based on receiving a response, e.g., within a predetermined response time period such as 1 second, 5 seconds, etc. Conversely, the vehicle computer 110 may determine the user device 145 is not in communication with the vehicle computer 110 based on failing to receive a response, e.g., within the predetermined response time period. Upon determining the user device 145 is not in communication with the vehicle computer 110, the vehicle computer 110 can initiate the first timer. If the user device 145 communicates with the vehicle computer 110 prior to expiration of the first timer, then the vehicle computer 110 maintains the authorization of the user device 145. If the user device 145 does not communicate with the vehicle computer 110 prior to the expiration of the first timer, then the vehicle computer 110 suspends the authorization of the user device 145.

Upon suspending authorization of the user device 145, the vehicle computer 110 prevents operation of the vehicle 105 based on receiving a message from the user device 145. That is, the vehicle computer 110 ignores commands included in the message from the suspended user device 145. Said differently, the vehicle computer 110 does not actuate the vehicle component(s) 125 despite receiving commands from the suspended user device 145 to actuate the vehicle component(s) 125. The vehicle computer 110 may communicate with the user device 145 when the user device 145 authorization is suspended. Additionally, the vehicle computer 110 may maintain the authentication signature of the suspended user device 145 on the list of valid authentication signatures and the stored data received from with the suspended user device 145.

Additionally, upon suspending authorization of the user device 145, the vehicle computer 110 is programmed to initiate a second timer. The vehicle computer 110 then monitors for expiration of the second timer and at least one of the distance being less than or equal to the threshold distance or the user device 145 being in communication with the vehicle computer 110. A duration of the second timer is the second predetermined time, e.g., 60 days, 90 days, etc. The second predetermined time is specified by a vehicle and/or component manufacturer and may be stored, e.g., in the memory of the vehicle computer 110. The second predetermined time may be longer than the first predetermined time.

If the vehicle computer 110 determines the distance is less than or equal to the threshold distance and the user device 145 is in communication with the vehicle computer 110 prior to expiration of the second timer, i.e., within the second predetermined time, then the vehicle computer 110 requests a fourth user input via the user device 145. For example, the vehicle computer 110 may transmit a message to the user device 145 requesting a fourth user input specifying a vehicle parameter. A vehicle parameter means a measurable physical parameter, i.e., a measurement of a physical phenomenon, for a vehicle, e.g., an odometer value, a tire pressure, a fuel level, etc.

Upon receiving a message from the user device 145 specifying the vehicle parameter, the vehicle computer 110 can compare the received vehicle parameter to a stored vehicle parameter, e.g., stored in a memory of the vehicle computer 110. For example, the vehicle computer 110 can receive and analyze data from one or more sensors 115 to determine the stored vehicle parameter. If the received vehicle parameter matches the stored vehicle parameter, then the vehicle computer 110 determines the fourth user input is valid. The vehicle computer 110 reauthorizes the user device 145 based on determining the fourth user input is valid prior to expiration of the second timer. That is, the vehicle computer 110 determines the user device 145 is authorized based on receiving a valid fourth user input prior to expiration of the second timer. Upon reauthorizing the user device 145, the vehicle computer 110 can control the vehicle 105 based on commands received from the reauthorized user device 145, as discussed above.

The vehicle computer 110 deauthorizes the user device 145 based on failing to receive a valid fourth user input prior to expiration of the second timer, i.e., within the second predetermined time. If the received vehicle parameter does not match the stored vehicle parameter, then the vehicle computer 110 determines the fourth user input is invalid. Upon determining the fourth user input is invalid, the vehicle computer 110 can count a number of invalid fourth user inputs. The vehicle computer 110 compares the number of invalid fourth user inputs to a threshold. The threshold specifies a number of invalid user inputs below which the vehicle computer 110 can reauthorize the user device 145. The threshold may be a predetermined number, e.g., 3, 5, 10, etc., specified by a vehicle and/or component manufacturer. The threshold may be stored, e.g., in a memory of the vehicle computer 110. Upon determining an invalid fourth user input, the vehicle computer 110 can increase the count of invalid fourth user inputs, e.g., by one. If the number of invalid fourth user inputs is equal to the threshold, then the vehicle computer 110 deauthorizes the user device 145. If the number of invalid fourth user inputs is less than the threshold, then the vehicle computer 110 maintains the authorization of the user device 145.

If the vehicle computer 110 determines that the distance remains greater than the threshold distance or the user device 145 is not in communication with the vehicle computer 110 for the second predetermined time, i.e., the duration of the second timer, then the vehicle computer 110 deauthorizes of the user device 145. Upon deauthorizing the user device 145, the vehicle computer 110 stops communicating with the user device 145. Additionally, the vehicle computer 110 can remove the authentication signature for the deauthorized user device 145 from the list of valid authentication signatures. That is, the vehicle computer 110 ignores messages from the deauthorized user device 145 that include commands to operate the vehicle 105. Further, the vehicle computer 110 may prevent the deauthorized user device 145 from accessing the vehicle computer 110 and/or transferring data with the vehicle computer 110. The vehicle computer 110 may remove stored data, e.g., from the memory of the vehicle computer 110, received from the deauthorized user device 145.

The user device 145 may provide a location of the user device 145 to the vehicle computer 110. For example, the user device 145 may receive location data, e.g., GPS coordinates, of the user device 145 from one or more sensors in the user device 145. In such an example, the user device 145 can then transmit the location data of the user device 145 to the vehicle computer 110. That is, the user device 145 can provide a current location of the user to the vehicle computer 110. Alternatively, the user device 145 may provide location data of the user device 145 to the remote server computer 140. In such an example, the remote server computer 140 can provide the location of the user device 145 to the vehicle computer 110, e.g., via the network 135.

The user device 145 is programmed to run one or more applications stored in a memory. An "application" is programming stored in the memory of the user device 145 that includes instructions that the processor of the user device 145 executes to perform an operation. For example, the application can be a vehicle control application that includes instructions to transmit data from the user device 145 to the vehicle computer 110 and to receive data from the vehicle computer 110. That is, the vehicle control application includes instructions for the user device 145 to communicate with the vehicle computer 110. Example communications by the vehicle control application includes, e.g., transmission of a door unlock request, a climate control request, a remote start request, etc. The vehicle control application enables a user to request actuation of one or more vehicle components 125, e.g., when the user is remote from the vehicle 105.

The user device 145 is programmed to receive a second user input selecting the vehicle control application. For example, the user device 145 may actuate the user interface to detect a second user input selecting the vehicle control application. For example, the user interface may be programmed to display a virtual button on a touchscreen display that the user can press to select the vehicle control application. In other words, the user interface may activate sensors that can detect the user pressing the virtual button to select the vehicle control application. Upon detecting the second user input, the user interface can then provide the second user input to the user device 145, and the user device 145 can select the vehicle control application. Upon selecting the vehicle control application, the user device 145 can transmit a request to initiate communication, e.g., via the network 135, to the vehicle computer 110.

The user device 145 can actuate the user interface to detect a third user input commanding actuation of one or more vehicle components 125. For example, the user interface may be programmed to display one or more virtual buttons on the user interface that the user can press to request actuation of a corresponding vehicle component 125. For example, one virtual button may represent a vehicle door, and the user can press the virtual button to lock or unlock the vehicle door. In other words, the user interface may activate sensors that can detect the user pressing the virtual button to request actuation of a corresponding vehicle component 125. Upon detecting the third user input, the user interface can then provide the third user input to the user device 145, and the user device 145 can provide a message to the vehicle computer 110 based on the third user input. The message includes commands to actuate the vehicle component 125 specified by the third user input.

The user device 145 can receive a request from the vehicle computer 110 to provide a message specifying a vehicle parameter. In this situation, the user device 145 actuates the user interface to detect a fourth user input specifying the vehicle parameter. For example, the user interface may be programmed to display virtual buttons representing alpha-numerical characters on a touchscreen included in the user interface that the user can press or otherwise select to specify the vehicle parameter. In other words, the user interface may activate sensors that can detect the user pressing the virtual buttons to specify the vehicle parameter. Upon detecting the fourth user input, the user interface can then provide the fourth user input to the user device 145, and the user device 145 can provide a message specifying the vehicle parameter to the vehicle computer 110.

The user device 145 can actuate the user interface to detect a fifth user input deselecting the vehicle control application. For example, the user interface may be programmed to display a virtual button or the like on a touchscreen included in the user interface that the user can press or otherwise select to deselect the vehicle control application. In other words, the user interface may activate sensors that can detect the user pressing the virtual button to deselect the vehicle control application. Upon detecting the fifth user input, the user interface can then provide the fifth user input to the user device 145, and the user device 145 can deselect the vehicle control application based on the fifth user input. In this situation, the user device 145 stops communicating with the vehicle computer 110, e.g., regardless of whether the distance is less than the threshold distance.

FIG. 2 is a diagram of an example process 200 for deauthorizing a user device 145. The process 200 begins in a block 205. The process 200 can be carried out by a vehicle computer 110 included in the vehicle 105 executing program instructions stored in a memory thereof.

In the block 205, the vehicle computer 110 authorizes the user device 145. For example, the vehicle computer 110 may authorize the user device 145 based on determining a received key matches an expected key, e.g., known to certain parties such as vehicle distributors, e.g., dealers, stored in the memory of the vehicle computer 110. As another example, the vehicle computer 110 may receive a request to access the vehicle 105 from the user device 145, as discussed above. The vehicle computer 110 can then actuate an HMI 118 to detect a first user input verifying the user device 145. The vehicle computer 110 may authorize the user device 145 based on receiving the first user input within a time period, e.g., 10 seconds, 30 seconds, etc., after actuating the HMI 118. The vehicle computer 110 may actuate one or more vehicle components 125 based on receiving a message from an authorized user device 145, as discussed above. The process 200 continues in a block 210.

In the block 210, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive location data, e.g., geo-coordinates, of the vehicle 105, e.g., from a sensor 115, a navigation system, etc. Additionally, the vehicle computer 110 can receive location data, e.g., geo-coordinates, of the user device 145 from the user device 145, as discussed above. The process 200 continues in a block 215.

In the block 215, the vehicle computer 110 determines whether a distance between the vehicle 105 and the user device 145 is greater than a threshold distance. For example, the vehicle computer 110 can determine the distance between the vehicle 105 and the user device 145 based on determining a length of a line between the geo-coordinates specifying the vehicle 105 location and the geo-coordinates specifying the user device 145 location, as discussed above. The vehicle computer 110 can then compare the distance to the threshold distance. If the distance is less than or equal to the threshold distance, then the process 200 continues in a block 220. Otherwise, the process 200 continues in a block 225.

In the block 220, the vehicle computer 110 maintains the authorization of the user device 145. That is, the vehicle computer 110 may actuate one or more vehicle components 125 based on receiving a message from an authorized user device 145, as discussed above. The process 200 returns to the block 210.

In the block 225, the vehicle computer 110 monitors the communication between the user device 145 and the vehicle 105. For example, the vehicle computer 110 may send a message to the user device 145, e.g., via the network 135. The vehicle computer 110 may determine that the user device 145 is in communication with the vehicle computer 110 based on receiving a response, e.g., within a predetermined response time period such as 1 second, 5 seconds, etc. Conversely, the vehicle computer 110 may determine the user device is not in communication with the vehicle computer 110 based on failing to receive a response, e.g., within the predetermined response time period. If the user device 145 is in communication with the vehicle computer 110, then the process 200 returns to the block 220. Otherwise, the process 200 continues to a block 230.

In the block 230, the vehicle computer 110 monitors for the expiration of a first timer. Specifically, upon initiating the first timer, the vehicle computer 110 monitors for the distance between the vehicle 105 and the user device 145 and communication between the vehicle 105 and the user device 145. If the vehicle computer 110 determines, within a first predetermined time, i.e., prior to expiration of the first timer, the distance is less than the distance threshold or the user device 145 is in communication with the vehicle computer 110, then the process 200 returns to the block 220. If the vehicle computer 110 determines the first timer expires prior to determining the distance is less than the threshold distance or the user device 145 is in communication with the vehicle computer 110, then the process 200 continues to a block 235.

In the block 235, the vehicle computer 110 suspends authorization of the user device 145. Upon suspending authorization of the user device 145, the vehicle computer 110 prevents operation of the vehicle 105 based on receiving a message from the suspended user device 145. That is, the vehicle computer 110 ignores commands included in the message from the suspended user device 145. The vehicle computer 110 may communicate with the user device 145 when the user device 145 authorization is suspended. The process 200 continues in a block 240.

In the block 240, the vehicle computer 110 monitors for the expiration of a second timer. The second predetermined time may be longer than the first predetermined time. Specifically, upon initiating the second timer, the vehicle computer 110 monitors for the distance between the vehicle 105 and the user device 145 and communication between the vehicle 105 and the user device 145. If the vehicle computer 110 determines, within a second predetermined time, i.e., prior to expiration of the second timer, the distance is less than the distance threshold or the user device 145 is in communication with the vehicle computer 110, then the process 200 continues in a block 250. If the vehicle computer 110 determines the second timer expires prior to determining the distance is less than the threshold distance or the user device 145 is in communication with the vehicle computer 110, then the process 200 continues in a block 245.

In the block 245, the vehicle computer 110 deauthorizes the user device 145. Upon deauthorizing the user device 145, the vehicle computer 110 stops communicating with the user device 145. Specifically, the vehicle computer 110 ignores messages from the deauthorized user device 145 that include commands to operate the vehicle 105. Further, the vehicle computer 110 may prevent the deauthorized user device 145 from accessing the vehicle computer 110 and/or transferring data with the vehicle computer 110. The process 200 ends following the block 245.

In the block 250, the vehicle computer 110 requests a user input via the user device 145. For example, the vehicle computer 110 may transmit a message to the user device 145 requesting a user input specifying a vehicle parameter. A vehicle parameter means a measurable physical parameter, i.e., a measurement of a physical phenomenon, for a vehicle, e.g., an odometer value, a tire pressure, a fuel level, etc. The process 200 continues in a block 255.

In the block 255, the vehicle computer 110 determines whether the user input is valid. Upon receiving the message from the user device 145 specifying the vehicle parameter, the vehicle computer 110 can compare the received vehicle parameter to a stored vehicle parameter, e.g., stored in a memory of the vehicle computer 110. The vehicle computer 110 determines the user input is valid based on determining the received vehicle parameter matches the stored vehicle parameter. The vehicle computer 110 determines the user input is invalid based on determining the received vehicle parameter does not match the stored vehicle parameter.

If the user input is invalid, the vehicle computer 110 can count a number of invalid user inputs. The vehicle computer 110 compares the number of invalid user inputs to a threshold. Upon determining an invalid user input, the vehicle computer 110 can increase the count of invalid user inputs, e.g., by one. If the number of invalid user inputs is equal to the threshold or the vehicle computer 110 does not receive a valid user input prior to expiration of the second timer, i.e., within the second predetermined time, then the process 200 continues in the block 245. If the vehicle computer 110 receives a valid user input prior to expiration of the second timer, i.e., within the second predetermined time, the process 200 continues in a block 260.

In the block 260, the vehicle computer 110 reauthorizes the user device 145. That is, the vehicle computer 110 determines the user device 145 is authorized. Upon reauthorizing the user device 145, the vehicle computer 110 can control the vehicle 105 based on receiving a message from the reauthorized user device 145, as discussed above. The process 200 ends following the block 260.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
suspend authorization of a user device based on determining, for a first predetermined time, a distance between the user device and a vehicle is greater than a threshold distance;
then, based on suspending authorization of the user device based on determining the distance, request a user input specifying a vehicle parameter that is a measurable physical parameter of the vehicle;
upon receiving the user input, validate the user input based on the user input matching a stored vehicle parameter; and
deauthorize the user device based on a) failing to receive a valid user input within a second predetermined time, or b) receiving a number of invalid user inputs equal to a threshold number.

2. The system of claim 1, wherein the instructions further include instructions to reauthorize the user device based on receiving the valid user input within the second predetermined time.

3. The system of claim 2, wherein the instructions further include instructions to, upon reauthorizing the user device, actuate a vehicle component based on receiving a message from the user device.

4. The system of claim 1, wherein the instructions further include instructions to, upon suspending authorization of the user device, prevent actuation of a vehicle component based on receiving a message from the user device.

5. The system of claim 1, wherein the instructions further include instructions to suspend authorization of the user device based further on the user device not being in communication with the vehicle for the first predetermined time.

6. The system of claim 5, wherein the instructions further include instructions to maintain the authorization of the user device based on determining, within the first predetermined time, that the user device is in communication with the vehicle.

7. The system of claim 6, wherein the instructions further include instructions to maintain the authorization of the user device based on determining, within the first predetermined time, that the distance is less than or equal to the threshold distance.

8. The system of claim 1, wherein the instructions further include instructions to determine the distance based on comparing location data of the vehicle to location data of the user device.

9. The system of claim 1, wherein the instructions further include instructions to, upon deauthorizing the user device, stop communicating with the user device.

10. The system of claim 1, wherein the instructions further include instructions to maintain the authorization of the user device based on determining, within the first predetermined time, the distance is less than or equal to the threshold distance.

11. The system of claim 1, wherein the instructions further include instructions to actuate a vehicle component based on receiving a message from an authorized user device.

12. The system of claim 1, wherein the second predetermined time is longer than the first predetermined time.

13. A method, comprising:
suspending authorization of a user device based on determining, for a first predetermined time, a distance between the user device and a vehicle is greater than a threshold distance;
then, based on suspending authorization of the user device based on determining the distance, requesting a user input specifying a vehicle parameter that is a measurable physical parameter of the vehicle;
upon receiving the user input, validating the user input based on the user input matching a stored vehicle parameter; and
deauthorizing the user device based on a) failing to receive a valid user input within a second predetermined time, or b) receiving a number of invalid user inputs equal to a threshold number.

14. The method of claim 13, further comprising reauthorizing the user device based on receiving the valid user input within the second predetermined time.

15. The method of claim 13, further comprising, upon suspending authorization of the user device, preventing actuation of a vehicle component based on receiving a message from the user device.

16. The method of claim 13, further comprising suspending authorization of the user device based further on the user device not being in communication with the vehicle for the first predetermined time.

17. The method of claim 13, further comprising determining the distance based on comparing location data of the vehicle to location data of the user device.

18. The method of claim 13, further comprising, upon deauthorizing the user device, stopping communication with the user device.

19. The method of claim 13, further comprising maintaining the authorization of the user device based on determining, within the first predetermined time, the distance is less than or equal to the threshold distance.

20. The method of claim 13, further comprising actuating a vehicle component based on receiving a message from an authorized user device.

* * * * *

UNITED STATES PATENT AND TRADEMARK OFFICE
CERTIFICATE OF CORRECTION

PATENT NO. : 11,455,852 B2
APPLICATION NO. : 17/171018
DATED : September 27, 2022
INVENTOR(S) : Venkata Kishore Kajuluri et al.

It is certified that error appears in the above-identified patent and that said Letters Patent is hereby corrected as shown below:

On the Title Page

Item (54) Title and in the Specification, Column 1, Lines 1-2: replace "VEHICLE DEAUTHORTIZATION OF USER DEVICE" with "--VEHICLE DEAUTHORIZATION OF USER DEVICE--"

Signed and Sealed this
Tenth Day of January, 2023

Katherine Kelly Vidal
*Director of the United States Patent and Trademark Office*